United States Patent [19]

Gaston et al.

[11] Patent Number: 5,743,136
[45] Date of Patent: Apr. 28, 1998

[54] FLUID LEVEL SENSOR WITH RESISTIVE AND CONDUCTIVE LAYERS

[75] Inventors: Robert Duane Gaston, Dearborn Heights; Narayanaswamy Rajendran, Canton, both of Mich.

[73] Assignee: Ford Motor Company, Dearborn, Mich.

[21] Appl. No.: 534,780

[22] Filed: Sep. 27, 1995

[51] Int. Cl.⁶ .............. G01F 23/36; G01F 23/52; G01F 23/60
[52] U.S. Cl. .................. 73/313; 73/308
[58] Field of Search ............ 73/304 R, 308, 73/313, 317, 319; 338/33

[56] References Cited

U.S. PATENT DOCUMENTS

| | | | |
|---|---|---|---|
| 4,627,283 | 12/1986 | Nishida et al. | 73/308 |
| 4,641,523 | 2/1987 | Andreasson | 73/313 |
| 4,744,247 | 5/1988 | Kaminski | 73/308 |
| 4,827,769 | 5/1989 | Riley et al. | 73/313 |
| 4,873,865 | 10/1989 | Gaston | 73/317 |
| 4,912,646 | 3/1990 | Cerruti | 73/308 |
| 4,924,704 | 5/1990 | Gaston | 73/317 |
| 4,931,764 | 6/1990 | Gaston | 338/185 |
| 5,051,719 | 9/1991 | Gaston et al. | 338/162 |
| 5,129,261 | 7/1992 | Riley | 73/313 |
| 5,146,785 | 9/1992 | Riley | 73/304 R |
| 5,267,475 | 12/1993 | Gaston | 73/319 |
| 5,272,918 | 12/1993 | Gaston et al. | 73/369 |

FOREIGN PATENT DOCUMENTS

| | | |
|---|---|---|
| 2613478A1 | 10/1988 | France . |
| 2012433 | 7/1979 | United Kingdom . |

*Primary Examiner*—William L. Oen
*Attorney, Agent, or Firm*—Mark S. Sparschu

[57] ABSTRACT

In one embodiment of the present invention, a fluid level sensor includes a resistive element and a float coupled to a contact. The float moves in response to the fluid level, causing the contact to follow a path on the resistive element. The resistive element includes a layer of resistive material disposed on an insulating substrate. The resistive element also includes a layer of conductive material disposed on the layer of resistive material. The conductive material is disposed in segments along the path followed by the contact. This embodiment of the present invention provides a high-durability fluid level sensor which further provides low electrical noise.

9 Claims, 3 Drawing Sheets

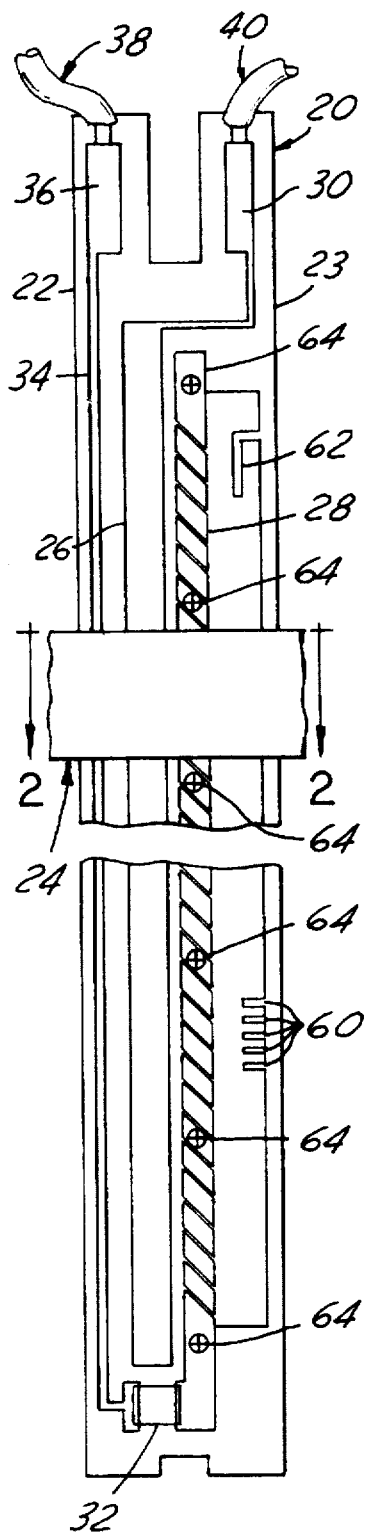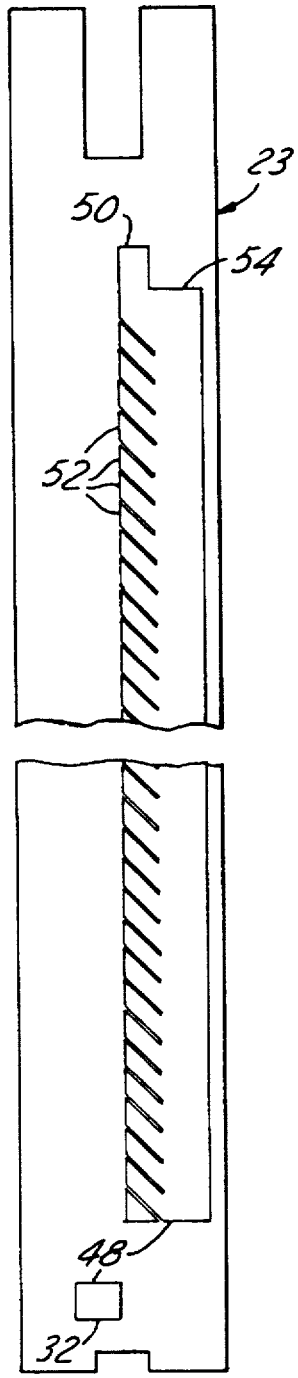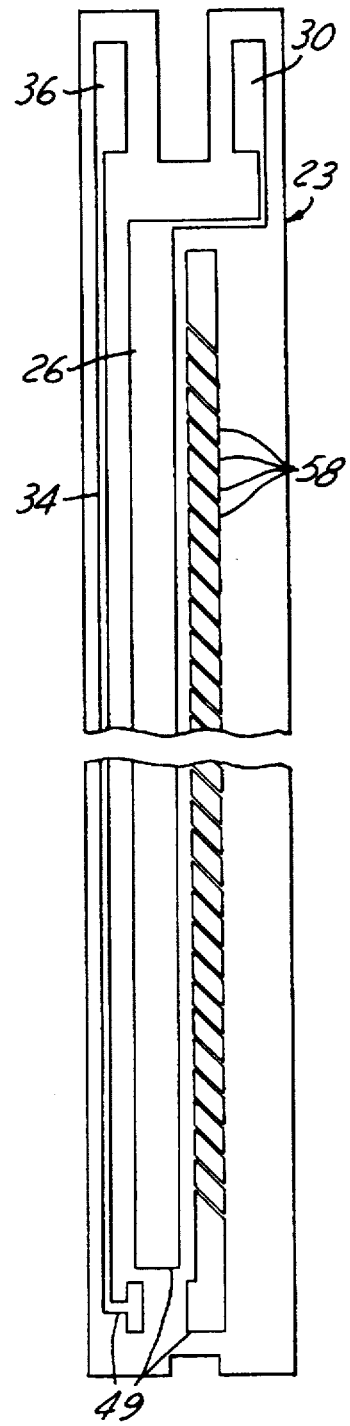

FLUID LEVEL SENSOR WITH RESISTIVE AND CONDUCTIVE LAYERS

BACKGROUND OF THE INVENTION

1. Field of the Invention

The present invention relates to fluid level sensors.

2. Description of the Related Art

In sensing the level of fuel in the fuel tank of a motor vehicle, a conventional fuel level sensor has a resistor card. The conventional fuel level sensor also has a float which follows the level of fuel in the fuel tank. Responsive to the movement of the float is a contact which follows a path on the resistor card. Through this movement of the contact in response to the fuel level in the tank, a variable resistance is provided by the fuel level sensor. A fuel gauge electrically coupled to the fuel level sensor measures the variable resistance and displays the level of fuel in the fuel tank.

In a conventional fuel level sensor, the path followed by the contact is along metallized conductors running transverse to the path followed by the contact. The conductors are all in electrical contact with resistive ink applied to the resistor card. A concern with such a configuration is that the contact will, under some circumstances, wear through the conductors. This will cause an open circuit in the fuel level sensor for some fuel levels.

A solution to this problem has been proposed in U.S. Pat. No. 4,931,764, issued to Gaston. In the '764 patent, a layer of resistive material is applied over the conductors ("overprinted") to provide added wear resistance.

Although the approach in the '764 patent is extremely effective in preventing wear of the conductors, the overprinted resistive material is less "friendly" of a material on which to travel for the contact of the fuel level sensor. One manifestation of this situation is that the relatively coarse resistive material provides a somewhat electrically "noisy" signal. In some fuel gauges, this noisy signal can provide a concern regarding proper operation of the gauge.

One proposed solution to this shortcoming of the design of the '764 patent is the addition of an additional overprint of conductive material on top of the resistive overprint. As can be appreciated, this design begins to get very expensive, having three layers (conductors, resistive overprint and conductive overprint) printed on the resistor card.

Therefore, a highly-durable fluid level sensor which reduces electrical noise without requiring three printed layers will provide advantages over alternative fuel level sensor designs.

SUMMARY OF THE INVENTION

The present invention provides a sensor for measuring a level of liquid in a vessel. The sensor comprises a resistor element having an insulating substrate and a float adapted to move in response to the liquid level. Also, the sensor includes a contact responsively coupled to the float and disposed to travel in a path on the resistor element, the travel responsive to the movement of the float in response to the liquid level. Additionally, the sensor comprises a resistive layer deposited on the insulating substrate, at least a portion of the resistive layer located along the path followed by the contact. Further, the sensor includes conductive segments deposited on the resistive layer along the path, the conductive segments disposed such that travel of the contact along its path will result in the contact successively contacting the segments.

The present invention also provides a resistor element for a fluid level sensor. The resistor element comprises an insulating substrate and a path adapted for travel by an electrical contact in response to the fluid level. Further, the resistor element includes a resistive layer deposited on the insulating substrate, at least a portion of the resistive layer located along the path. Also, the resistor element comprises conductive segments disposed on the resistive layer along the path, the conductive segments disposed such that travel of the contact along the path will result in the contact successively contacting the conductive segments.

The present invention provides a highly-durable fluid level sensor having low electrical noise. These advantages are provided without needing three printed layers of conductive and/or resistive material in the sensor. The present invention thus provides substantial advantages over alternative designs.

BRIEF DESCRIPTION OF THE DRAWINGS

FIG. 1 is a front view of a fluid level sensor 20 according to one embodiment of the present invention

FIG. 3 is a front view of the substrate 23 of fluid level sensor 20 with a resistive layer 48 applied.

FIG. 4 is a front view of the substrate 23 of fluid level sensor 20 with a conductive layer 49 applied.

DETAILED DESCRIPTION OF THE PREFERRED EMBODIMENT

Figure 2:
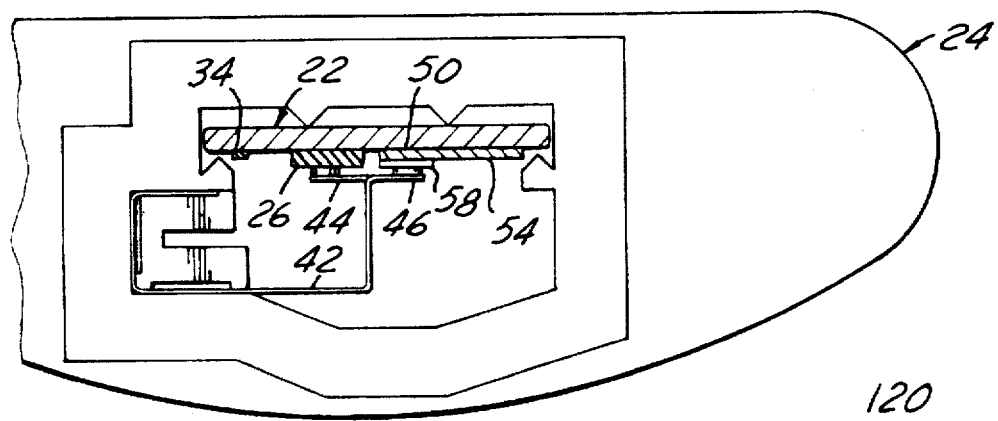
FIG. 2 is a top cross-sectional view of fluid level sensor 20 taken through line 2—2 of FIG. 1.

Referring to FIG. 1, a fuel level sensor 20 according to one embodiment of the present invention will be described. Fuel level sensor 20 includes a resistor element 22 and a float 24. Fuel level sensor 20 is preferably suspended vertically in a fuel tank of a motor vehicle. Float 24 moves up and down with the level of fuel in the fuel tank.

Resistor element 22 has a substrate 23 preferably comprising metal coated with electrically-insulating ceramic material. Disposed on the substrate 23 of resistor element 22 are two tracks 26 and 28. Track 26 is made of high-conductivity material and is connected to solder pad 30. Track 28 is connected via fixed resistor 32 and conductor 34 to solder pad 36. Track 28 is designed to be electrically resistive. The construction of track 28 will be described in more detail below.

Wires 38 and 40 are soldered to solder pads 30 and 36 for connection of fuel level sensor 20 to an analog or digital fuel gauge (not shown).

As an alternative to soldering wires 38 and 40 directly to resistor element 22, an edge-board-type connector having spring-loaded terminals crimped and/or soldered to wires 38 and 40 can be employed. With the edge-board connector in place on resistor element 22, the terminals would be biased against pads 30 and 36.

With the two electrical termination points for resistor element 22 preferably at the top of resistor element 22, the potential for float 24 to become entangled with wires 38 and 40 is very low. This is to be compared with the somewhat greater potential for entanglement if the termination points for wires 38 and 40 are at the bottom of resistor element 22.

Referring now additionally to FIG. 2, it is seen that float 24 includes a contact member 42 having contacts 44 and 46 which are electrically coupled to one another and are further biased against resistor element 22. Contact 44 rides in contact with track 26 as float 24 moves up and down. Likewise, contact 46 rides in contact with track 28 as float 24 moves up and down. Thus, as float 24 moves up and down with the level of fuel in the fuel tank, a variable resistance is coupled between solder pads 30 and 36. When float 24 is at its lowest extent (i.e., when the fuel tank is empty), fixed resistor 32 is coupled between solder pads 30 and 36.

If more information about the design of float 24 and contact member 42 is required, the reader is directed to U.S. Pat. No. 5,267,475, issued to Gaston, the disclosure of which is hereby incorporated by reference.

The construction of resistor element 22 will be described with reference to FIG. 3. Resistor material 48 is applied to the insulating substrate of resistor element 22. The resistor material 48 includes a first portion 50 along the path followed by contact 46 of float 24 (FIG. 2). This first portion 50 is divided into discrete segments 52.

Resistor material 48 further comprises a trim section 54. This trim section 54 is joined to segments 52 of first portion 50.

Resistor material 48 also comprises fixed resistor 32.

Resistor material 48 can be a number of materials, among them palladium-type or ruthenium-type resistive ink. The ink is preferably applied by a silk-screen thick-film process.

Now, with additional reference to FIG. 4, conductor material 49 is applied in the locations shown in FIG. 4. Note that the resistor material 48 described with reference to FIG. 3 is not shown in FIG. 4 for clarity of presentation.

The conductor material 49 includes track 26, conductor 34 and solder pads 30 and 36, as previously described with reference to FIG. 1. The conductor material 49 also includes a series of discrete pads 58. Pads 58 are electrically isolated from one another (but for the fact that they are in electrical communication with one another through resistor material 48 (FIG. 3). Pads 58 are located coincidentally on top of segments 52 of resistor material 48. Pads 58 are spaced such that contact 46 (FIG. 2) is always in contact with at least one pad 58, unless perhaps when float 24 is at the extreme top or bottom of its travel. That is, contact 46 will experience no discontinuities between pads 58.

The conductor material 49 can be a number of high-conductivity materials including high-silver-content silver-palladium ink. The ink is preferably applied by a silk-screen thick-film process.

It should be noted that both resistive segments 52 and conductive pads 58 are angled downward, in the direction that float 24 (FIG. 1) travels as the fuel level in the fuel tank is decreasing. This downward angling helps assure that contact 46 of float 24 does not get "hung up" (that is, stuck) at the boundary between two pads 58. This concern about contact 46 getting "hung up" is really only a potential concern when fuel level is decreasing. When fuel level is increasing (that is, when the fuel tank is being filled), float 24 has sufficient buoyancy to be reliably raised by the increasing fuel level.

The high reliability with which float 24 will move downward in the present design means that float 24 can be made less massive (and therefore smaller) than would otherwise be required. The reduced size of float 24 means that float 24 can move closer to the bottom and top of resistive element 22 in sensing fuel level. This provides increased flexibility in designing a fuel tank/fuel level sensor system.

As can be appreciated from the preceding discussion of FIGS. 1-4, as fuel level varies and float 24 moves up and down, a variable resistance will be provided between solder pads 30 and 36. This variable resistance is indicative of the fuel level in the fuel tank. When the fuel tank is empty and float 24 is at the bottom of its travel, fixed resistor 32 is coupled between solder pads 30 and 36.

As needed, trim section 54 of the resistor material 48 of fuel level sensor 20 can be trimmed to assure that the resistance provided by fuel level sensor 20 at test points 64 is precisely to specification. The trimming can include straight trims 60; "L"-shaped trims 62 or abrasions in the trim section 54 to modify the resistance of fuel level sensor 20.

The design of fuel level sensor 20 reduces electrical noise which can otherwise be generated by contact 46 riding on relatively coarse resistive material. As was illustrated with reference to FIGS. 3 and 4, only two printing steps (versus three in alternative designs) are used.

Figure 5:
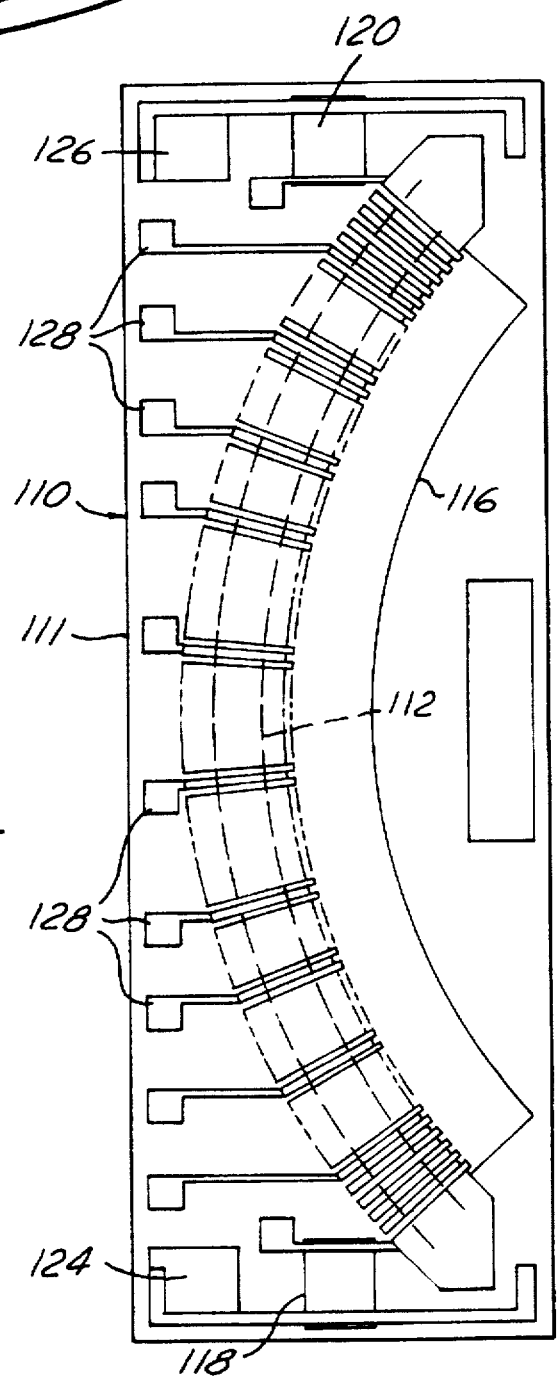
FIG. 5 is a front view of a resistor card 110 for a fluid level sensor according to a second embodiment of the present invention.

Referring now to FIG. 5, an angular resistive element 110 for a fuel level sensor will be described. Resistive element 110 is designed for use in conventional fuel level sensors having a float attached to an arm. The float moves up and down with fuel level, moving a contact along a path 112. Resistive element 110 comprises a resistive layer and a conductive layer applied to an insulating substrate 111.

Figure 6:
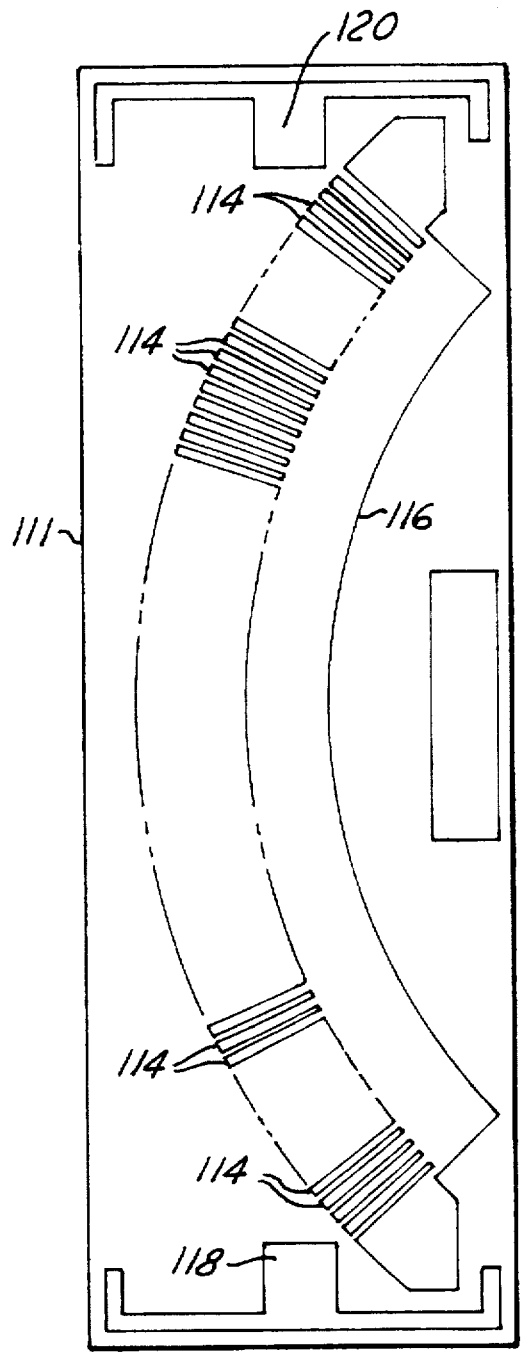
FIG. 6 is a front view of the substrate 111 of resistor card 110 with a resistive layer applied.

FIG. 6 shows a resistive layer applied to substrate 111. This resistive layer includes resistor material disposed in segments 1 14 disposed along path 112 (FIG. 5). These segments 114 are spaced apart by a small spacing. Segments 114 all contact a trim section 116. Fixed resistors 118 and 120, formed of resistor material, are also provided.

Figure 7:
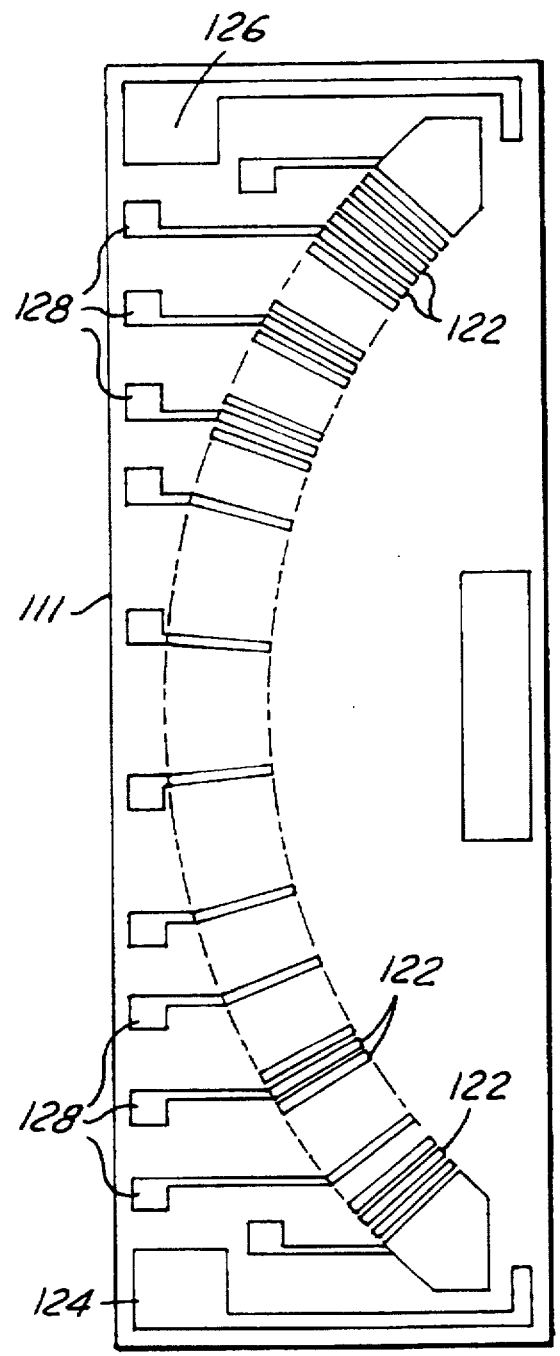
FIG. 7 is a front view of the substrate 111 of resistor card 110 with a conductive layer applied.

FIG. 7 shows a conductive layer which is added after the resistive layer. Note that the resistive layer of FIG. 6 is omitted in FIG. 7 for clarity of presentation. The conductive layer includes discrete pads 122, which are disposed coincidentally on segments 114 of resistor material. The conductive layer further includes solder pads 124 and 126. Additionally, the conductive layer includes test pads 128, for testing the resistance of the fuel level sensor containing resistive element 110.

Referring again to FIG. 5, a wire (not shown) is soldered to solder pad 124 or 126, depending upon which end of resistor element 112 is approached by the contact as the fuel level in the fuel tank decreases. A second wire is customarily coupled to the contact which moves along path 112 as the fuel level in the fuel tank changes. A variable resistance between those two wires is thus provided. This resistance is a function of the fuel level in the fuel tank and can be measured by a fuel gauge.

Depending upon which solder pad 124 or 126 is employed, fixed resistor 118 or 120 provides a fixed resistance value when the fuel level in the fuel tank is empty.

Trim section 116 can be trimmed as necessary such that the resistance of resistive element 110 is within specification at all test points 128. This trimming can be done in any of the variations discussed in relation to FIG. 1.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A sensor for measuring a level of liquid in a vessel, said sensor comprising:

a resistor element having an insulating substrate;

a float;

a contact responsively coupled to said float and slidably biased against said resistor element, slidable movement of said contact with respect to said resistor element defining a path traveled by said contact along said resistor element;

a resistive layer deposited on said insulating substrate, at least a portion of said resistive layer located along said path; and conductive segments deposited on said resistive layer along said path, said conductive segments disposed such that travel of said contact along said path will result in said contact successively contacting said segments.

2. A sensor as recited in claim 1, wherein said portion of said resistive layer located along said path comprises segments substantially coincident with said segments of said conductive layer.

3. A sensor as recited in claim 1, wherein said segments are angled toward a direction traveled by said contact when said liquid level drops.

4. A sensor as recited in claim 1, wherein said segments are said resistive layer comprises a portion from which material has been removed for adjustment of a resistance of said resistor element; and said portion is located adjacent to an edge of said resistor element.

5. A sensor as recited in claim 1, wherein said path is substantially straight.

6. A sensor as recited in claim 5, wherein said path is substantially vertical.

7. A sensor as recited in claim 6, wherein:

said resistive element further comprises a conductive track generally parallel to said path;

said resistive element further comprises a first electrical termination point adjacent to an uppermost portion of said resistive element and in electrical communication with said conductive track; and said resistive element further comprises a second electrical termination point adjacent to an uppermost portion of said resistive element and in electrical communication with said resistive layer.

8. A sensor as recited in claim 7, wherein said electrical termination points comprise solder pads formed of conductive material disposed on said resistive element.

9. A sensor as recited in claim 1, wherein said path is substantially arcuate.

* * * * *